United States Patent
Ascher et al.

(10) Patent No.: US 8,807,650 B2
(45) Date of Patent: Aug. 19, 2014

(54) INFANT TO ADULT ADJUSTABLE CAR SEAT

(71) Applicants: Barbara Ascher, Ontario, CA (US); Lenard Ascher, Ontario, CA (US)

(72) Inventors: Barbara Ascher, Ontario, CA (US); Lenard Ascher, Ontario, CA (US)

( * ) Notice: Subject to any disclaimer, the term of this patent is extended or adjusted under 35 U.S.C. 154(b) by 84 days.

(21) Appl. No.: 13/678,405

(22) Filed: Nov. 15, 2012

(65) Prior Publication Data
US 2013/0285427 A1 Oct. 31, 2013

Related U.S. Application Data

(60) Provisional application No. 61/638,659, filed on Apr. 26, 2012.

(51) Int. Cl.
| | |
|---|---|
| *B60N 2/00* | (2006.01) |
| *B60N 2/02* | (2006.01) |
| *B60N 2/26* | (2006.01) |
| *B60N 2/28* | (2006.01) |
| *B60N 2/44* | (2006.01) |
| *B60N 2/62* | (2006.01) |

(52) U.S. Cl.
CPC ............... *B60N 2/0232* (2013.01); *B60N 2/26* (2013.01); *B60N 2/2863* (2013.01); *B60N 2/449* (2013.01); *B60N 2/265* (2013.01); *B60N 2/0248* (2013.01); *B60N 2/62* (2013.01)
USPC ................ 297/284.3; 297/217.3; 297/284.11; 296/68

(58) Field of Classification Search
CPC ...... B60N 2/0232; B60N 2/0248; B60N 2/26; B60N 2/265; B60N 2/62; B60N 2/449; B60N 2/2863
USPC ........... 297/233, 284.3, 298.9, 284.11, 217.3; 296/68
See application file for complete search history.

(56) References Cited

U.S. PATENT DOCUMENTS

| | | | |
|---|---|---|---|
| 2,584,481 | A | 2/1952 | Mast et al. |
| 2,966,201 | A | 12/1960 | Strahjer |
| 3,094,354 | A | 6/1963 | Bernier |
| 3,256,033 | A * | 6/1966 | Adams et al. .................... 296/68 |
| 3,817,571 | A * | 6/1974 | Horvat et al. ................ 296/68.1 |
| 3,951,450 | A | 4/1976 | Gambotti |
| 4,230,366 | A | 10/1980 | Ruda |
| 4,533,176 | A | 8/1985 | Wyttenbach |
| 4,540,216 | A | 9/1985 | Hassel, Sr. |
| 4,555,135 | A | 11/1985 | Freeland |
| 4,655,503 | A | 4/1987 | Kamijo et al. |
| 4,664,443 | A | 5/1987 | Casale |
| 4,900,086 | A | 2/1990 | Steward |

(Continued)

*Primary Examiner* — Jeanette E Chapman
(74) *Attorney, Agent, or Firm* — Kirk A. Buhler; Buhler & Associates

(57) ABSTRACT

Improvements in a car seat where the car seat is adjustable to accommodate infants to adults. The seat has adjustments for the sides, seat, back and belt position. The seat uses servo motors with an intelligent controller that utilizes a memory position feature along with preset locations based upon different weight, age or height information. The seat pads can move separately or collectively to position the seat prior to an adult, toddler or child being seated. Side supports can elevate and or fold inward to reduce side-to-side motion. The back rest may also be movable to push the child further forward in the seat. The setting can be altered and or stored when different children are seated or as the child grows until they can be seated in the flat adult position. An insert is used to place a newborn in a backward facing reclined position.

20 Claims, 5 Drawing Sheets

(56) References Cited

U.S. PATENT DOCUMENTS

| | | | | |
|---|---|---|---|---|
| 4,900,087 | A | 2/1990 | Crisp | |
| 4,936,627 | A | 6/1990 | Guim | |
| 5,205,608 | A | 4/1993 | Stig | |
| 5,409,293 | A | 4/1995 | Nagasaka | |
| 5,542,742 | A | 8/1996 | Fulgenzi et al. | |
| 5,568,959 | A | 10/1996 | Weber | |
| 5,722,724 | A | 3/1998 | Takei et al. | |
| 6,088,643 | A * | 7/2000 | Long et al. | 701/49 |
| 6,502,901 | B2 | 1/2003 | Deptolla | |
| 7,159,941 | B2 | 1/2007 | Thomas | |
| 7,188,898 | B2 * | 3/2007 | Patterson et al. | 297/250.1 |
| 7,322,651 | B2 * | 1/2008 | Makhsous et al. | 297/284.6 |
| 7,458,635 | B2 | 12/2008 | Mendis et al. | |
| 7,810,883 | B2 * | 10/2010 | Berger et al. | 297/256.1 |
| 8,141,946 | B2 * | 3/2012 | Kramer | 297/217.3 |
| 8,190,332 | B2 * | 5/2012 | Saban | 701/45 |
| 8,474,908 | B2 * | 7/2013 | Petzel et al. | 297/284.3 |
| 8,602,478 | B2 * | 12/2013 | Voelz | 296/63 |
| 2005/0006939 | A1 | 1/2005 | Hancock et al. | |
| 2005/0280297 | A1 * | 12/2005 | Patterson et al. | 297/217.4 |
| 2006/0208549 | A1 | 9/2006 | Hancock et al. | |
| 2008/0197677 | A1 * | 8/2008 | Nivet | 297/68 |
| 2008/0246318 | A1 * | 10/2008 | Bothe et al. | 297/217.3 |
| 2008/0255734 | A1 * | 10/2008 | Altshuller et al. | 701/49 |
| 2009/0002184 | A1 | 1/2009 | Lenneman et al. | |
| 2009/0102257 | A1 * | 4/2009 | Collias | 297/256.16 |
| 2009/0273213 | A1 * | 11/2009 | Mukherjee | 297/217.3 |

\* cited by examiner

INFANT TO ADULT ADJUSTABLE CAR SEAT

CROSS REFERENCE TO RELATED APPLICATIONS

This application claims the benefit of Provisional Application Ser. No. 61/638,659 filed Apr. 26, 2012 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the invention

This invention relates to improvements in vehicle car seat. More particularly, the present invention relates to a multi-servo adjustable car seat with movable base, back and sides that adjusts from an infant to an adult.

2. Description of Related Art Including Information Disclosed Under 37 CFR 1.97 and 1.98.

A child is often transported in an automobile. A number of regulations require that the child be properly restrained in the seat until they reach an appropriate age, weight or height. Over time the appropriate age, weight or height of the baby has increased to eight years of age and younger. This requirement may continue to change. The major reason for the regulation is to accommodate the child in a car seat that is configured to accommodate an adult.

One of the simplest ways to satisfy the requirement is to install a car seat within a vehicle. As the child grows in size the seat must be replaced with a larger seat until the child is large enough to not require the seat. Over the years a number of seat manufacturers have tried to accommodate children by making chairs that have fold-out features that essentially raise the seating platform. These devices can then be folded back into the seat to accommodate an adult. A number of patents and or publications have been made to address these issues. Exemplary examples of patents and or publication that try to address this /these problem(s) are identified and discussed below.

U.S. Pat. No. 3,951,450 issued Apr. 20, 1976 to Paul Gambotti and U.S. Pat. No. 4,655,503 issued Apr. 7, 1987 to Ken Kamijo et al., both disclose integrated child car seats where the child seat folds out from the back of the car seat. Because the child seat folds out from the back of the seat, the front of the seat is still available for an adult occupant. While these patents disclose an automobile seat that converts into a seat that can hold a child the child seat is configured in only one size and is not automatically adjustable.

U.S. Pat. No. 5,568,959 issue Oct. 29, 1996 to Weber et al. discloses a vehicle seat with an integrated booster seat with interchangeable modules. This patent has a booster seat that is stored within the backrest of the seat. The backrest is opened to fold out the booster seat. A variety of modules can be interchanged with the seat to accommodate different sized children as the children grow larger. While this patent provides multiple seating options for a growing child, the modules must be manually interchanged.

U.S. Pat. No. 7,159,941 issued Jan. 9, 2007 to Rodney Thomas discloses a vehicular child seat assembly. The child seat is integrated into the car seat. The backrest of the car seat folds out to provide a reclined rear facing position for a new born or infant. This patent provides seating for a rear facing child but does not provide for a larger child that can sit in a forward facing position and the conversion must be performed manually.

U.S. Pat. No. 4,540,216 issued Sep. 10, 1985 to Karl D. Hassel, U.S. Pat. No. 4,533,176 issued Aug. 6, 1985 to Bill Wyttenbach and U.S. Pat. No. 4,900,4086 issued Feb. 13, 1990 to Royce E. Steward each disclose a forward facing child seat that folds out from the backrest of a chair. In all of these patents the child seat is basically a booster seat that can accommodate up to a particular size. Because they only accommodate a child to a given size they are not useful for a broad range of child growth.

What is needed is a car seat that uses multiple moving surfaces that are changeable as a child gets larger as well and movable to accommodate an adult. Additionally the changes to the surfaces should be provided automatically and with a memory to return to preset, memory or selectable positions. The proposed car seat in this document provides a solution.

BRIEF SUMMARY OF THE INVENTION

It is an object of the infant to adult automotive seat to adjust to accommodate a growing child from infant to toddler to child to adult. While the chair accommodates a wide variety of growth an infant insert is used to place a baby in a reversed and or reclined position. This insert would be used until the child can be placed in a forward facing upright position. Each of these different sized groups can require a different seat elevation, side support, back support and belt position.

It is an object of the infant to adult automotive seat to have adjustments for the sides, seat, and back. The bottom can be raised and lowered from being parallel with the remainder of the car seats or bench to elevating the seat thereby allowing a child to look out of the vehicle window(s). The side supports can elevate and or fold inward to reduce side-to-side motion. The side supports from both sides of the bottom seat as well as the sides from the back support can also adjust to nestle the child. The back rest may also be movable to push the child further forward in the seat. The movement of the back rest may also be integrated with movement of a leg or foot support that is located in the front of the seat. The position of the belt and shoulder strap is also movable to place the belt in the optimal position for the child or adult.

It is another object of the infant to adult automotive seat to utilize servo motors that can determine the position of the seat. The servo motors are controllable for motion and are often currently used to position a driver seat. The servo motors can operate off of the 12 volt electrical system of a vehicle.

It is still another object of the infant to adult automotive seat to utilize a memory position feature along with preset locations based upon different weight, age or height information. Because the seat uses the aforementioned servo motors the different servo motors can move separately or collectively to position the seat prior to an adult or child being seated. The setting can be altered and or stored when different children are seated or as the child grows until they can be seated in the flat adult position.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG, 8 shows a block diagram of the control electronics.

DETAILED DESCRIPTION OF THE INVENTION

Figure 1A:
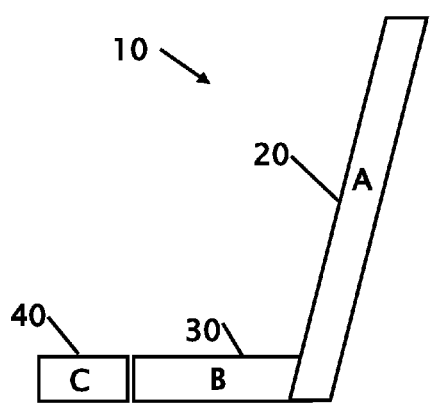
FIG. 1A shows a side view of the automobile seat in the adult position.
Figure 1B:
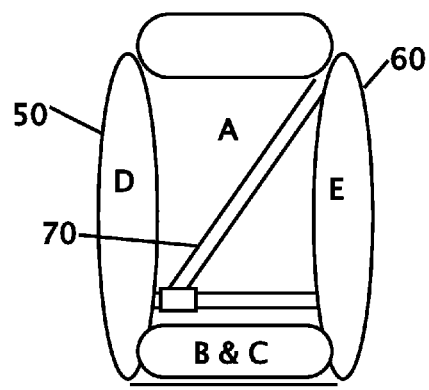
FIG. 1B shows a front view of the automobile seat in the adult position.

FIG. 1A shows a side view of the automobile seat 10 in the adult position, FIG. 1B shows a front view of the automobile seat 10 in the adult position. The automobile seat changes shape to accommodate an infant, toddler, child and adult passenger as shown in FIGS. 1A and 1B. The seat belt 70 for each position will be incorporated into the seat that meets state and national standards. In the adult position the seat adjusts back to a standard seat. The backrest 20 is essentially parallel with other seats in a row. The bottom seat cushion 30 is lowered and leveled with other seats in the same row. The thigh support 40 aligns with the bottom seat cushion 30 making an essentially planar surface that emulates a standard car seat. The left 50 and right 60 side supports are brought essentially parallel with the backrest 20. The seat belt 70 is positioned for an over-the-lap position as well as for over-the-shoulder support.

Figure 2A:
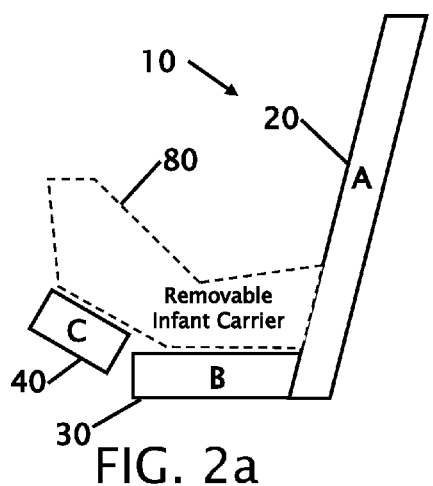
FIG. 2A shows a side view of the automobile seat in the infant position.
Figure 2B:
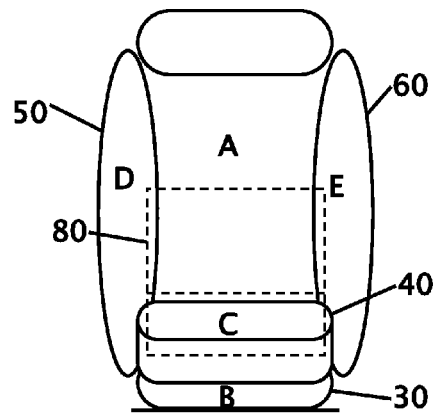
FIG. 2B shows a front view of the automobile seat in the infant position.

FIG. 2A shows a side view of the automobile seat 10 in the infant position, FIG. 2B shows a front view of the automobile seat in the infant position. In the infant position the seat bottom 30 moves to accommodate a removable infant carrier 80 that is belted into place. An infant is usually secured in a vehicle in a rear facing orientation. The removable infant carrier 80 is generally used until the child can be placed in a forward facing upright position. Because the removable infant carrier 80 is placed in the seat, the back rest 20 is placed in a configuration for an adult. The thigh support is elevated to further secure the removable infant carrier 80. The left 50 and right 60 side supports can be placed flat or can be slightly angled to further center and secure the removable infant carrier 80. The seat bottom 30 may be elevated to raise the removable infant carrier 80 to make the baby easier to care for and or view.

Figure 3A:
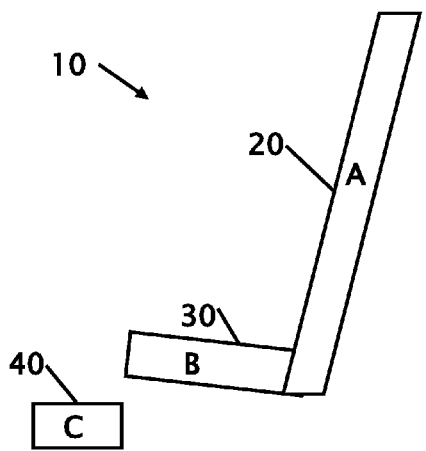
FIG. 3A shows a side view of the automobile seat in the toddler position.
Figure 3B:
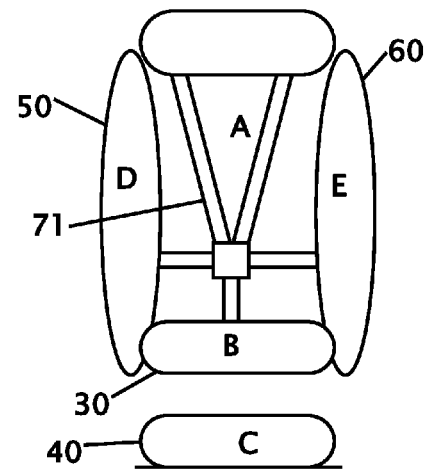
FIG. 3B shows a front view of the automobile seat in the toddler position.

FIG. 3A shows a side view of the automobile seat 10 in the toddler position, FIG. 3B shows a front view of the automobile seat in the toddler position. In the toddler position the seat bottom 30 moves up and angles, the side panels 50 and 60 move in to create a toddler seat with sufficient side-to-side support and the seat 10 has a five point seat belt harness 71 found in prior art installable car seats. The back support 20 is essentially oriented similar to an adult configuration but may be angled to allow for a more reclined resting position. The thigh support 40 is lowered to accommodate the shorter legs of a toddler. This configuration raises a toddler to the same essential height that a toddler might experience with a prior art installable child seat. Because the height and angle of the seat bottom 30 can be changed the position of the seat bottom 30 can be moved in small increments as the infant grows into a child.

Figure 4A:
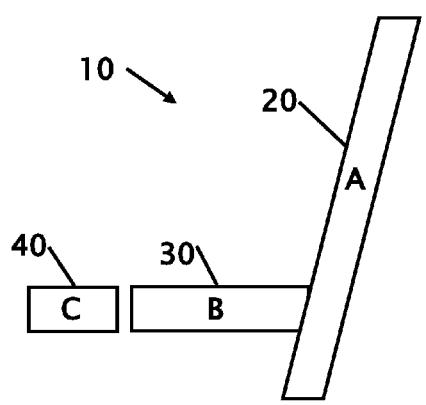
FIG. 4A shows a side view of the automobile seat in the child position.
Figure 4B:
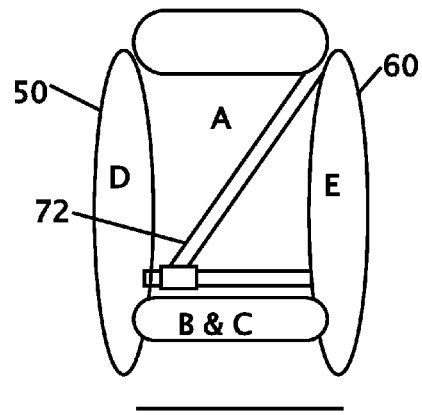
FIG. 4B shows a front view of the automobile seat in the child position.

FIG. 4A shows a side view of the automobile seat 10 in the child position, FIG. 4B shows a front view of the automobile seat in the child position. In the child position the bottom 30 of the seat moves up five inches or more and arm rests 50 and 60 move in. The shoulder strap 72 moves down to achieve an optimal support angle for a child. The back rest 20 can again be essentially parallel with other seats in a row or can be adjusted for optimal comfort of the child. As the legs of the child continues to grow the thigh support 40 can be raised, lowered or otherwise adjusted for the comfort of the child.

Figure 5:
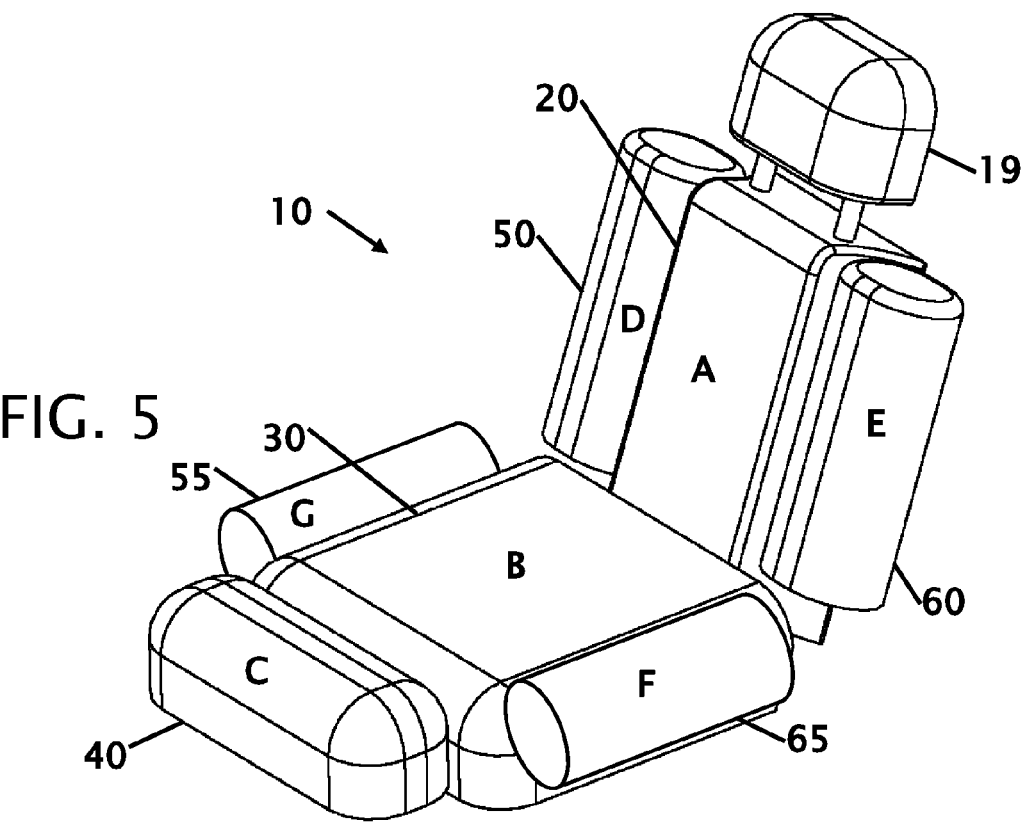
FIG. 5 shows a perspective view of the automobile seat in an adult position.
Figure 6:
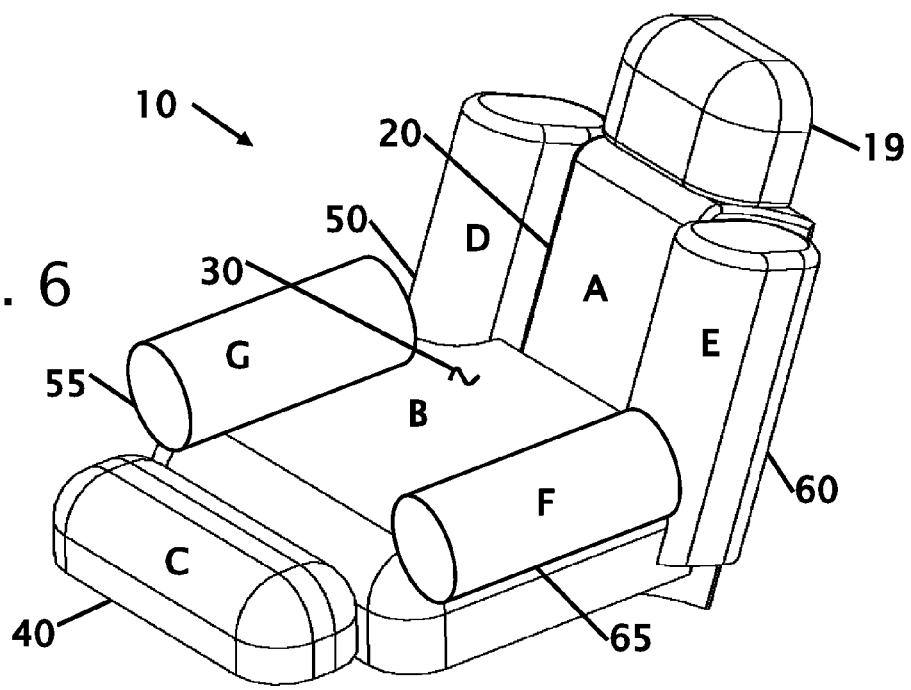
FIG. 6 shows a perspective view of the automobile seat in a custom child position.

FIG. 5 shows a perspective view of the automobile seat in an adult position and FIG. 6 shows a perspective view of the automobile seat in a custom child position with the thigh support 40 shown in a lowered position. These perspective views show the interaction of the back support 20, left 50 and right 60 side supports, seat bottom 30 and thigh support 40. Optional side seat supports 55 and 65 are also shown in these figures. This embodiment also shows a headrest 19 in an elevated orientation in FIG. 5 and in a lowered position in FIG. 6.

Figure 7:
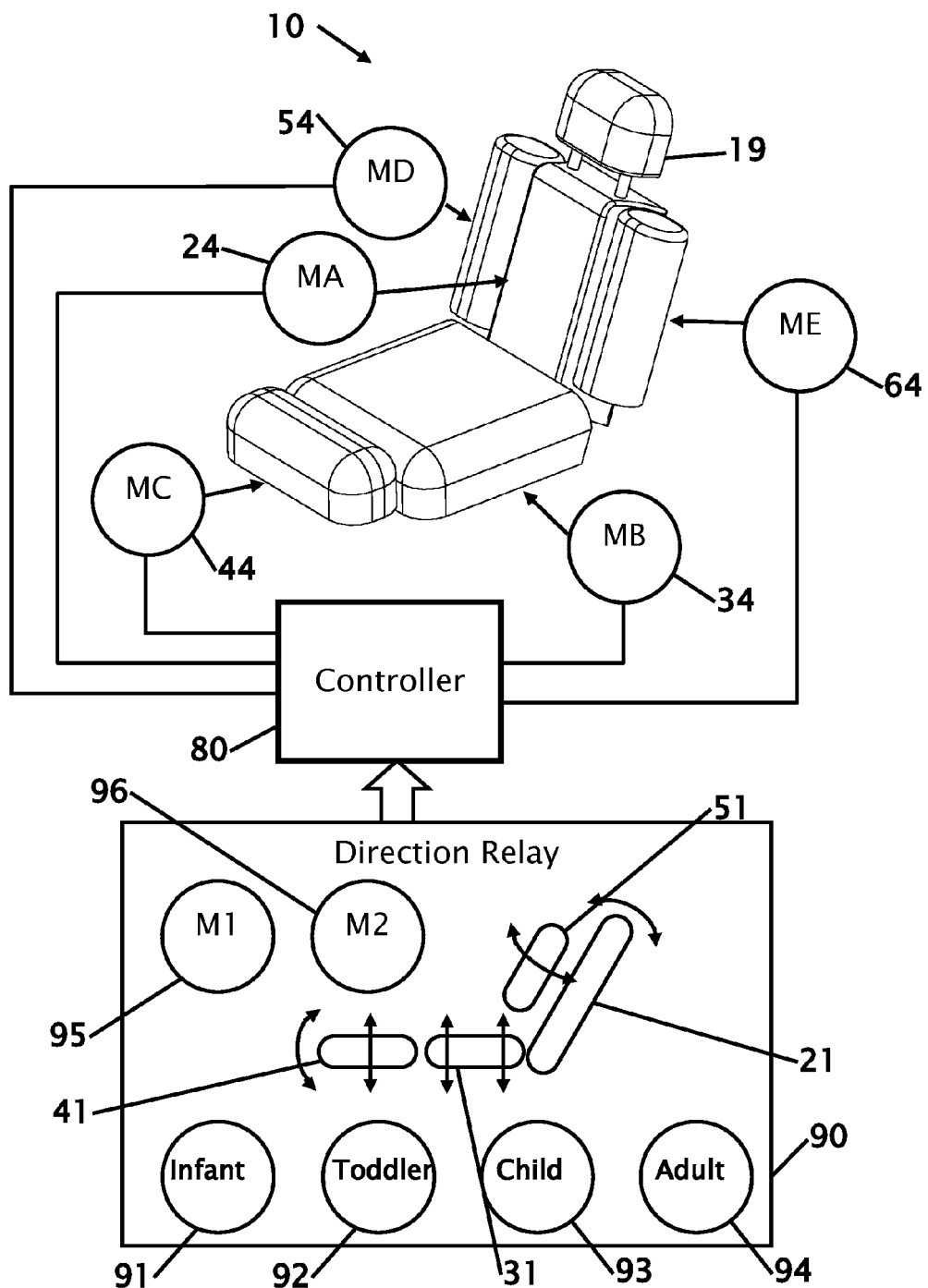
FIG. 7 shows a user control diagram.

FIG. 7 shows a user control diagram. The seat 10 changes shape with multiple servo motors mounted in the frame work of the seat. The servo motor operates with a controller 80 that is programmed to change the seat by pushing the correct button labeled for the desired position, infant 91, toddler 92, child 93 and adult 94. It is also contemplated that the user may optionally save their own unique settings by orienting the back rest 21, seat 31, thigh 41 and sides 51 using a control module 90 and then storing the unique position with memory button(s) 95 and 96. These positions are ideal for occupants that may be short adults or people that want a unique seat configuration.

Each one of the orienting surfaces back rest 21, seat 31, thigh 41 and sides 51 controls one or more servo motors for the back rest servo motor 24, seat servo motor 34, thigh servo motor 44 and sides servo motors 54 and 64 respectively. Optionally the headrest 19 may also be adjustable. The controller 80 interfaces between the user controls and the servo motors. An example of the control interface for a single surface, such as a back support 21 is shown and described in FIG. 8.

Figure 8:
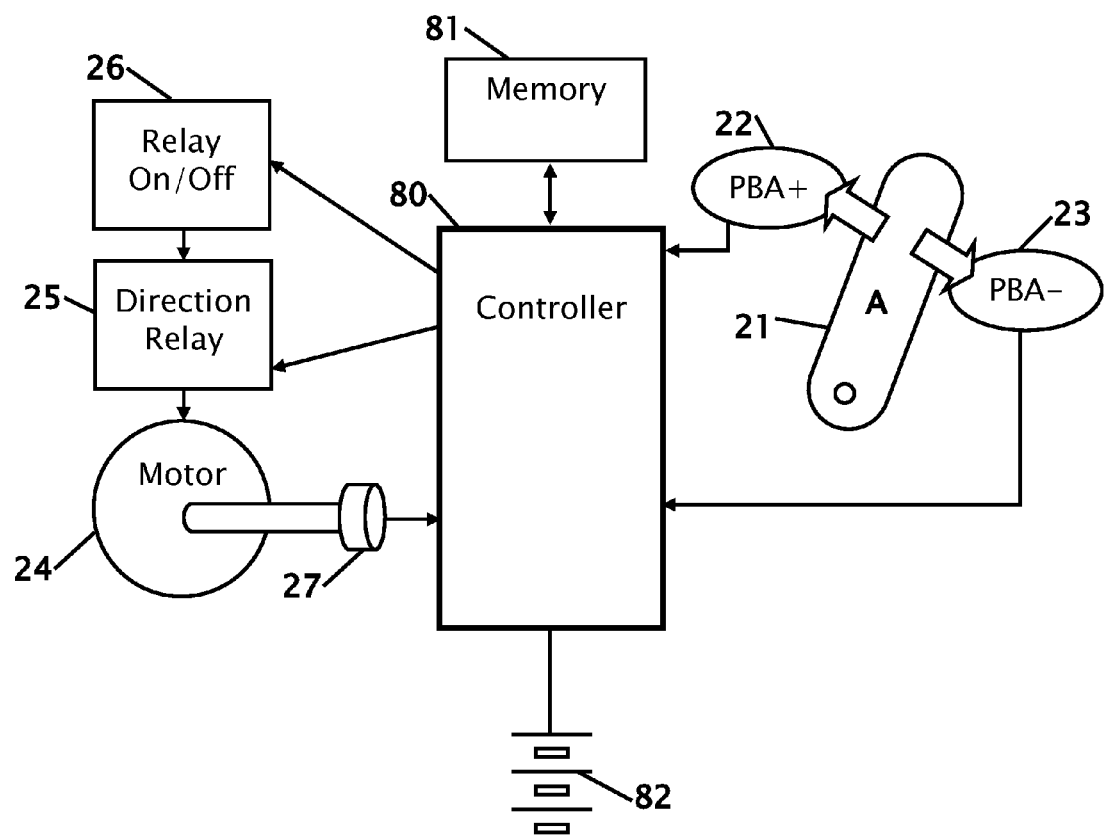

FIG. 8 shows a block diagram of the control electronics. The controller 80 is connected to the vehicle power supply 82. Each servo motor 24 is adjusted by an icon shaped element 21 that actuates switches 22 and 23 to move the seat component such as the backrest. When the switch, such as 22 or 23, is activated the controller 80 is notified. The controller will then activate an on-off relay 26 and a direction control relay 25 that will power the associated servo motor 24 to move the seat cushion. The servo 24 is connected to an encoder or equivalent measurement mechanism 27 to determine where the position of the seat cushions. The encoder 27 is connected to the controller that remembers the seat/servo position. The location of each servo can be placed in memory 81 for later recall. The recall can be one of the preset or user stored positions as shown in FIG. 7. When a desired position is recalled the controller 80 will load the memory 81 position and then move each of the seat surfaces to return the seat to the requested position. While a particular set of controller, motor, switches and relays or controls has been shown and described other equivalent or superior controls are contemplated that can move, position and store known and or custom seat positions.

While a single automotive seat is shown, it is contemplated that a vehicle can have more than one infant to adult automotive seat. The infant to adult automotive seat(s) can be offered as optional equipment for new vehicles or an upgrade product.

Thus, specific embodiments of an infant to adult automotive seat have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. An infant to adult automotive seat comprising:
   an adjustable vehicle seat that is integrated into a vehicle;
   said adjustable vehicle seat has movable cushions that are moved by at least one motor to control each said movable cushion;
   said movable cushions including at least a seat cushion, a leg support cushion, a back support cushion, a left back support cushion and a right back support cushion;
   a controller that reads an encoder on each motor;
   at least two known positions whereby said controller can move each motor to position each said movable cushion, and
   wherein said left back support cushion or said right back support cushion moves when an associated door of said vehicle is opened or closed.

2. The infant to adult automotive seat according to claim 1 wherein said leg support cushion is movable both above and below said seat cushion.

3. The infant to adult automotive seat according to claim 1 wherein one of said at least two known positions is for a known child size.

4. The infant to adult automotive seat according to claim 1 wherein one of said at least two known positions is established by a user.

5. The infant to adult automotive seat according to claim 1 wherein said encoder is a binary encoder or a potentiometer.

6. The infant to adult automotive seat according to claim 1 that further includes side movable cushions within said seat cushion that are movable to alter a width of said seat cushion.

7. The infant to adult automotive seat according to claim 1 wherein said left back support cushion and said right back support cushion are movable to alter a width of said seat cushion.

8. The infant to adult automotive seat according to claim 1 that further includes at least one user storeable position.

9. The infant to adult automotive seat according to claim 1 that further includes an algorithm that allows said seat to set a position based upon an age of a child.

10. The infant to adult automotive seat according to claim 1 further includes an algorithm that allows said seat to set a position based upon a weight of a child.

11. The infant to adult automotive seat according to claim 1 that includes an algorithm that allows said seat to automatically adjust a position of said seat based upon chronological duration.

12. The infant to adult automotive seat according to claim 1 that further includes a securing means for securing a baby carrier.

13. The infant to adult automotive seat according to claim 1 wherein said seat is powered by said vehicle.

14. The infant to adult automotive seat according to claim 1 wherein said cushions are padded and covered.

15. The infant to adult automotive seat according to claim 1 that further includes a microprocessor.

16. The infant to adult automotive seat according to claim 1 wherein said left seat cushion and said right seat cushion move with a single motor.

17. The infant to adult automotive seat according to claim 1 wherein said left back support cushion and said right back support cushion move with a single motor.

18. The infant to adult automotive seat according to claim 1 that further includes a headrest.

19. The infant to adult automotive seat according to claim 1 that further includes a seat belt.

20. The infant to adult automotive seat according to claim 1 that further includes a five point harness.

* * * * *